United States Patent [19]

Ohmori et al.

[11] Patent Number: 4,504,642
[45] Date of Patent: Mar. 12, 1985

[54] ACRYLIC TYPE SELF-ADHESIVE

[75] Inventors: Akira Ohmori, Ibaraki; Nobuyuki Tomihashi, Takatsuki, both of Japan

[73] Assignee: Daikin Kogyo Co., Ltd., Osaka, Japan

[21] Appl. No.: 416,161

[22] Filed: Sep. 9, 1982

[30] Foreign Application Priority Data

Sep. 10, 1981 [JP] Japan ................................ 56-143342

[51] Int. Cl.³ .......................................... C08F 214/18
[52] U.S. Cl. .................................... 526/246; 428/421; 526/245
[58] Field of Search ........................... 526/245, 246

[56] References Cited

U.S. PATENT DOCUMENTS

| | | | |
|---|---|---|---|
| 2,628,958 | 2/1953 | Bittles | 526/245 |
| 2,811,501 | 10/1957 | Stedry | 526/246 |
| 2,826,564 | 3/1958 | Bovey et al. | 526/246 |
| 2,839,513 | 6/1958 | Ahlbrecht et al. | 526/246 |
| 3,102,103 | 8/1963 | Ahlbrecht et al. | 526/245 |
| 3,277,039 | 10/1966 | Marascia et al. | 526/245 |
| 3,282,905 | 11/1966 | Fasick et al. | 526/245 |
| 3,378,609 | 4/1968 | Fasick et al. | 526/245 |
| 3,384,627 | 5/1968 | Anello et al. | 526/245 |
| 3,459,696 | 8/1969 | Read | 526/245 |
| 3,547,856 | 12/1970 | Tandy | 526/245 |
| 3,637,614 | 1/1972 | Greenwood | 526/245 |
| 3,645,989 | 2/1972 | Tandy | 526/245 |
| 3,645,990 | 2/1972 | Raynolds | 526/245 |
| 3,654,244 | 4/1972 | Pittman et al. | 526/246 |
| 3,808,179 | 4/1974 | Gaylord | 526/245 |
| 3,838,104 | 9/1974 | Hayashi et al. | 526/245 |
| 3,950,315 | 4/1976 | Cleaver | 526/245 |
| 4,013,627 | 3/1977 | Temple | 526/245 |
| 4,130,706 | 12/1978 | Plembeck | 526/245 |
| 4,147,851 | 4/1979 | Raynolds | 526/245 |

Primary Examiner—Harry Wong, Jr.
Attorney, Agent, or Firm—Birch, Stewart, Kolasch & Birch

[57] ABSTRACT

An acrylic type self-adhesive which comprises a polymer comprising (a) units of at least one compound of the formula:

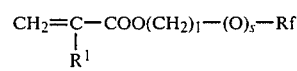

wherein $R^1$ is a hydrogen atom or a methyl, ethyl or propyl group, l is an integer of 1 to 5, s is 0 or 1, and Rf is $-(CF_2)_mX$ or $-(CF_2)_pO(CF_2)_nF$ (wherein m is an integer of 1 to 10, X is a hydrogen or fluorine atom or a hexafluoroisopropyl group, n is an integer of 1 to 5 and p is an integer of 1 to 3), and optionally units of (b) at least one compound of the formula:

$$CH_2=\underset{R^2}{\overset{|}{C}}-COR^3$$

wherein $R^2$ is a hydrogen atom or a methyl, ethyl or propyl group and $R^3$ is $-OH$, $-NH_2$, $-NHCH_2OH$,

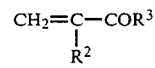

$-OCH_2CH_2OH$,

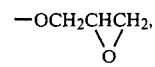

or $-OCH_2CH_2N(CH_3)_2$, said polymer having an intrinsic viscosity of 0.1 to 1.0, which shows excellent oil resistance and water resistance.

5 Claims, No Drawings

ACRYLIC-TYPE SELF-ADHESIVE

The present invention relates to an acrylic type self-adhesive usable for a pressure-sensitive adhesive tape.

There are known self-adhesives comprising rubbers (e.g. natural rubbers, butylene rubber, acrylonitrile rubber, chloroprene rubber, styrene/butadiene rubber, urethane rubber); self-adhesives comprising polyvinyl ether, polyvinyl butyral, polyvinyl chloride, vinyl chloride/vinyl acetate copolymers, etc. compounded with a tackifier (e.g. rosin, rosin ester, natural resins, oil-soluble phenol resins); and acrylic type self-adhesives (e.g. polyacrylic esters) and the like.

These self-adhesives, however, have defects such as insufficient oil resistance and moisture resistance, and they are not suitable for use in atmospheres of oil mist and high humidity.

As a result of an extensive study, it has been found that a specific acrylic polymer affords a self-adhesive having good oil resistance and moisture resistance.

According to the present invention, there is provided an acrylic type self-adhesive which comprises a polymer comprising units of (a) at least one compound of the formula:

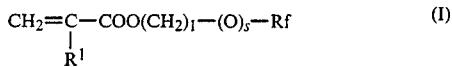

wherein $R^1$ is a hydrogen atom or a methyl, ethyl or propyl group, $l$ is an integer of 1 to 5, $s$ is 0 or 1, and Rf is $-(CF_2)_mX$ or $-(CF_2)_pO(CF_2)_nF$ (wherein m is an integer of 1 to 10, X is a hydrogen or fluorine atom or a hexafluoroisopropyl group, n is an integer of 1 to 5 and p is an integer of 1 to 3), and optionally units of (b) at least one compound of the formula:

wherein $R^2$ is a hydrogen atom or a methyl, ethyl or propyl group and $R^3$ is $-OH$, $-NH_2$, $-NHCH_2OH$,

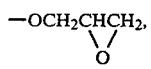

$-OCH_2CH_2OH$,

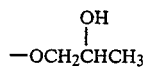

or $-OCH_2CH_2N(CH_3)_2$, said polymer having an intrinsic viscosity of 0.1 to 1.0.

The acrylic type self-adhesive of the present invention has water or moisture resistance as well as oil resistance to non-polar hydrocarbons (e.g. petroleum benzine, gasoline, benzene, toluene, xylene), alcohols (e.g. methanol, ethanol, butanol), and other oils (e.g. edible oils, mineral oils).

Specific examples of the monomer (I) are 2,2,3,3,4,4,5,5-octafluoropentyl acrylate, 2,2,3,3,3-pentafluoropropyl acrylate, 2,2,3,3,4,4,4-heptafluorobutyl acrylate, 2,2,3,4,4,4-hexafluorobutyl acrylate, 2,2,3,3,4,5,5,5-octafluoro-4-trifluoromethylpentyl acrylate, 5,5,6,6,7,7,7-heptafluoro-3-oxaheptyl acrylate, 2,2,3,3,3,5,5,5-heptafluoro-4-oxapentyl acrylate, 1,1-dihydronoalfuoro-4-oxahexyl acrylate and 1,1-dihydroundecafluoro-4-oxaheptyl acrylate, and corresponding methacrylate, 2-ethylacrylate and 2-propylacrylate, fluoroacrylate, etc. These monomers may be used alone or in combination.

Specific examples of the monomer (II) are acrylic acid, acrylamide, N-methylolacrylamide, methacrylic acid, methacrylamide-2-ethylacrylic acid, 2-ethylacrylamide, 2-propylacrylic acid, 2-propylacrylamide, etc. These monomers are used alone or in combination. The monomer (II) is used to strengthen adhesiveness and holding power to substrates of the self-adhesives and also to regulate the cohesive force of such self-adhesives.

When the monomer (I) is to be copolymerized with the monomer (II), the content of the monomer (I) varies with the required oil resistance and moisture resistance of the self-adhesive. But too small of a content result in too low of an oil resistance and moisture resistance, so that the content should be generally at least 30% by mole, preferably at least 70% by mole.

The polymer has an excellent oil resistance when it has a fluorine content of at least 20% by weight, particularly at least 45% by weight. When the fluorine content is less than the lower limit, the oil resistance is inferior. Further, when the number of carbon atoms of Rf exceeds 10, the polymerization rate lowers and the oil resistance is not remarkably improved.

When the intrinsic viscosity $[\eta]$ of the polymer is too large, the polymer becomes elastic and loses tackiness, so that such polymer is unsuitable for the self-adhesives. At the same time, the polymer having too small of an intrinsic viscosity is also unsuitable for the self-adhesives, since its cohesive force is small. Thus, the polymer is required to have an intrinsic viscosity of 0.1 to 1.0 for the purpose of use as a self-adhesives.

The glass transition point of the polymer may properly be adjusted according to the working temperature range. It is necessary for the glass transition point of the polymer to be lower than any of the working temperature. Usually, the glass transition point may be adjusted in the range of $-60°$ C. to $+90°$ C. Within the working temperature range of the usual self-adhesives, a glass transition point lower than $-5°$ C. is preferable.

The self-adhesives of the present invention may be prepared by polymerizing the monomer (I) and optionally the monomer (II) according to any of the conventional polymerization modes such as emulsion polymerization, solution polymerization, bulk polymerization, etc. In the case of emulsion polymerization, an anionic emulsifier (e.g. sodium salt of alkyl sulfate) and/or a nonionic emulsifier (e.g. polyethylene glycol alkyl ether, polyethylene glycol alkylphenyl ether) may be incorporated into an aqueous medium which has been made oxygen-free by nitrogen replacement if necessary. In the case of solution polymerization, the polymerization may be carried out in a single or mixed solvent of halogen-containing solvents (e.g. 1,1,2-trifluoro-1,2,2-trichloroethane, hexafluoro-m-xylene) or polar solvents (e.g. methylethylketone, methylisobutylketone, ethyl acetate, butyl acetate, tetrahydrofuran) which has been made oxygen-free by nitrogen replacement if necessary.

Examples of the polymerization catalyst are peroxides (e.g. hydrogen peroxide, benzoil peroxide, di-tert-butyl peroxide, cumene hydroxyperoxide, etc.), persulfates (e.g. ammonium persulfate, potassium persulfate, etc.), and azo compounds (e.g. azobisisobutyronitrile, 4,4-azobis(4-cyanovalerianic acid). The catalyst may be used in a proportion of 0.01 to 5% by weight based on the total weight of the monomer(s).

The intrinsic viscosity of the polymer may be controlled by adjustment of the concentration of the polymerization initiator and the polymerization temperature and addition of a chain transfer agent. It may also be controlled by adjustment of the ratio of the monomer(s) to the solvent. Examples of the chain transfer agent are longchain mercaptans (e.g. lauryl mercaptan, myristyl mercaptan, cetyl mercaptan, etc.). Preferably, the chain transfer agent is added in a proportion of 0.01 to 5% by weight based on the total weight of the monomer(s).

For adjusting the glass transition point (Tg), the monomers are copolymerized to obtain a copolymer having a composition calculated from the Tg of each homopolymer according to the following equation:

$$W_1/Tg_1 + W_2/Tg_2 = 1/Tg_{12}$$

wherein $W_1$ is a weight percent of the homopolymer 1, $W_2$ is a weight percent of the homopolymer 2, $Tg_1$ is a $Tg(°K.)$ of the homopolymer 1, $Tg_2$ is a $Tg(°K.)$ of the homopolymer 2, and $Tg_{12}$ is a $Tg(°K.)$ of the copolymer.

The intrinsic viscosity of the obtained polymer is measured at 35° C. in methylethylketone (MEK) or hexafluoro-m-xylene and its units are [dl/g]. As to the solvent, it is preferred to use one giving a larger intrinsic viscosity, because a solvent giving a larger intrinsic viscosity is a good solvent and, generally, the measurement of intrinsic viscosity is carried out in a good solvent. With the polymer according to the present invention, in general, hexafluoro-m-xylene is used for the polymer bearing Rf having eight or more carbon atoms and methyethylketone, for the polymer bearing Rf having seven or less carbon atoms, but this does not always apply. The thus obtained polymer may be used as such or incorporated with diluents and/or additives to formulate a self-adhesive composition.

The self-adhesives of the present invention may be applied as such to the substrates, or diluted with a solvent and then applied. As the solvent, those which can be used in the solution polymerization may be used.

The self-adhesives can stick to various substrates, for example, fluorocarbon polymers (e.g. polytetrafluoroethylene, hexafluoropropene/tetrafluoroethylene copolymer, polyvinylidene fluoride, fluoro elastomers, etc.), general-purpose resins (e.g. polyethylene, polypropylene, polyvinyl chloride, polyvinylidene chloride, polyester, amide resins, urea resins, phenol resins, melamine resins, etc.), semisynthetic fibers (e.g. cellophane, rayon, etc.), natural fibers (e.g. cotton, silk, wool, etc.), and other materials (e.g. non-woven fabric, paper, metal, glass, porcelain, ceramic, wood, leather, etc.).

The present invention will be hereinafter explained in detail by the following Examples.

EXAMPLE 1

To a 300 ml four-necked flask equipped with a stirrer, a thermometer, a dropping funnel and a reflux condenser, butyl acetate (100 ml), pentafluoropropyl acrylate monomer (30 g) and n-dodecyl mercaptan (0.1 g) were added. After replacing air in the system with nitrogen, the mixture was heated to 60° C. At the same temperature, a solution of azobisisobutyronitrile (hereinafter referred to as "AIBN") (0.15 g) in butyl acetate (10 ml) was added from the dropping funnel. Polymerization was continued for about 10 hours, and the reaction mixture was poured into petroleum ether to precipitate the polymer. After drying, pentafluoropropyl acrylate polymer was obtained. Tg: $-26°$ C. $[\eta]$ 0.6 (in MEK).

Then, the obtained polymer (20 g) was dissolved in a mixture of trifluorotrichloroethane and butyl acetate (2:1 by weight) (80 g), coated on corona-discharged polyester film of $150\mu$ in thickness and then dried. The acrylate polymer film was about $25\mu$ in thickness.

Neoflon film (tetrafluoroethylene/hexafluoropropylene copolymer manufactured by Daikin Kogyo Co., Ltd.) was pressed against the acrylate film under a pressure of 2 kg/cm². The two-layer film was cut in 50 mm wide, and the holding power was measured at a peeling angle of 180° and a pulling rate of 300 mm/min.

The oil resistance and water resistance tests were carried out as follows:

A test piece of 50 mm wide was dipped in a predetermined solvent for 2 hours, taken out and measured for the holding power under the same condition as above to calculate the retention ratio of holding power. The results are shown in Table 3.

EXAMPLES 2 TO 18

Measurement of the holding power and the oil resistance and water resistance tests were made in the same manner as in Example 1 but using polymers having a monomer composition as shown in Tables 1 and 2 and having Tg, intrinsic viscosity (measured in MEK) and fluorine content as shown in the same Tables. The results are shown in Table 3.

TABLE 1

| Example No. | R¹ | Compound (I) 1 | s | Rf | Tg (°C.) | [η] (dl/g) | Fluorine Content (%) |
|---|---|---|---|---|---|---|---|
| 1 | H | 1 | 0 | $CF_3CH_2-$ | −26 | 0.56 | 46.6 |
| 2 | H | 1 | 0 | $CF_3CFHCF_2-$ | −22 | 0.60 | 47.3 |
| 3 | H | 1 | 0 | $CF_3(CF_2)_2-$ | −30 | 0.32 | 52.3 |
| 4 | H | 1 | 0 | $CF_3(CF_2)_4-$ | −39 | 0.25 | 59.0 |
| 5 | H | 1 | 0 | $H(CF_2)_4-$ | −35 | 0.48 | 53.3 |
| 6 | H | 2 | 0 | $\begin{array}{c}CF_3\\ \phantom{x}\diagdown\\ \phantom{xx}CF-\\ \phantom{x}\diagup\\ CF_3\end{array}$ | −16 | 0.49 | 49.6 |
| 7 | H | 2 | 0 | $\begin{array}{c}CF_3\\ \phantom{x}\diagdown\\ \phantom{xx}CF(CF_2)_2-\\ \phantom{x}\diagup\\ CF_3\end{array}$ | −35 | 0.53 | 56.8 |
| 8 | H | 1 | 0 | $\begin{array}{c}CF_3\\ \phantom{x}\diagdown\\ \phantom{xx}CF(CF_2)_2-\\ \phantom{x}\diagup\\ CF_3\end{array}$ | −15 | 0.21 | 59.0 |
| 9 | H | 2 | 1 | $CF_3(CF_2)_2-$ | −45 | 0.49 | 46.8 |
| 10 | H | 1 | 0 | $C_2F_5OC_2F_4-$ | −49 | 0.15 | 53.4 |

TABLE 2

| Example No. | Monomer composition (% by weight) | | Tg (°C.) | [η] (dl/g) | Fluorine content (%) |
|---|---|---|---|---|---|
| 11 | Example 4 (80) | 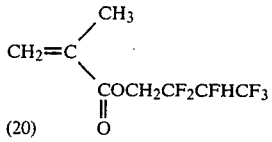 (20) | −25 | 0.46 | 56.3 |
| 12 | Example 4 (90) | Acrylic acid (10) | −30.1 | 0.21 | 53.1 |
| 13 | Example 4 (90) | Acrylamide (10) | −27.6 | 0.42 | 53.1 |
| 14 | Example 4 (90) | N—methylolacrlamide (10) | −31.5 | 0.12 | 53.1 |
| 15 | Example 4 (90) | Hydroxyethyl methacrylate (10) | −30.5 | 0.38 | 53.1 |
| 16 | Example 4 (90) | 2-Hydroxypropyl acrylate (10) | −31.0 | 0.21 | 53.1 |
| 17 | Example 4 (90) | N,N—Dimethylaminoethyl acrylate (10) | −35.0 | 0.12 | 53.1 |
| 18 | Example 4 (90) | Glycidyl methacrylate (10) | −29.0 | 0.52 | 53.1 |

TABLE 3

| Example No. | Holding power before treatment (kg/5 cm) | Retention ratio of holding power after dipping in solvent for 2 hours | | | | Retention ratio of holding power after dipping in water for 2 hours |
|---|---|---|---|---|---|---|
| | | RC-spindle oil | Petroleum benzene | Kerosene | Toluene | |
| 1 | 1.55 | 0.95 | 0.85 | 0.91 | — | 1.00 |
| 2 | 1.68 | 0.97 | 0.87 | 0.91 | — | 1.00 |
| 3 | 1.32 | 0.98 | 0.85 | 0.90 | — | 1.00 |
| 4 | 1.25 | 1.00 | 0.95 | 0.96 | 0.78 | 1.00 |
| 5 | 1.75 | 1.00 | 0.93 | 0.93 | 0.83 | 1.00 |
| 6 | 1.50 | 0.95 | 0.80 | 0.83 | — | 1.00 |
| 7 | 1.45 | 0.95 | 0.88 | 0.88 | — | 1.00 |
| 8 | 1.18 | 0.99 | 0.92 | 0.90 | — | 0.99 |
| 9 | 1.33 | 0.96 | 0.82 | 0.90 | — | 1.00 |
| 10 | 1.48 | 0.98 | 0.89 | 0.94 | — | 1.00 |
| 11 | 1.07 | 1.00 | 0.90 | 0.95 | — | 0.98 |
| 12 | 2.08 | 0.91 | 0.75 | 0.85 | 0.68 | 0.65 |
| 13 | 2.34 | 0.95 | 0.78 | 0.89 | 0.73 | 0.72 |
| 14 | 2.20 | 0.95 | 0.81 | 0.90 | 0.73 | 0.85 |
| 15 | 2.13 | 0.96 | 0.72 | 0.89 | — | 0.71 |
| 16 | 2.10 | 0.93 | 0.81 | 0.90 | — | 0.69 |
| 17 | 1.56 | 1.00 | 0.92 | 0.92 | — | 0.82 |
| 18 | 1.38 | 1.00 | 0.93 | 0.87 | — | 1.00 |

COMPARATIVE EXAMPLES 1 TO 7

Measurement of the holding power and the oil resistance and water resistant tests were made in the same manner as in Example 1 but using polymers having a monomer composition as shown in Table 4 for Comparative Examples 1 to 5, and tapes as shown in the same table for Comparative Examples 6 and 7. The results are shown in Table 5.

TABLE 4

| Comparative Example No. | Compound (I) (% by weight) | | | | Tg (°C.) | [η] (dl/g) | Fluorine Content (%) |
|---|---|---|---|---|---|---|---|
| | $R^1$ | l | s | Rf | | | |
| 1 | H | 1 | 0 | $CF_3(CF_2)_4$— | −39 | 1.5 | 59 |
| 2 | H | 1 | 0 | $CF_3(CF_2)_4$— | −39 | 0.05> | 59 |
| 3 | $CH_3$ | 1 | 0 | $HCF_2(CF_2)_4$— | +56 | 0.45 | 54.3 |
| 4 | Example 4 (30) | | | p-Propyl acrylate (70) | −43 | 0.38 | 17.7 |
| 5 | Example 4 (60) | | | Acrylic acid (40) | +3 | 0.42 | 35.4 |
| 6 | Nitto's acrylic type adhesive tape #31B*[1] | | | | — | — | — |
| 7 | Nitto's Damplon Tape*[2] | | | | — | — | — |

Note:
*[1]Nitto Electric Industrial Co., Ltd.
*[2]Nitto Electric Industrial Co., Ltd.

TABLE 5

| Comparative Exam- No. | Holding power before treatment (kg/5 cm) | Retention ratio of holding power after dipping in solvent for 2 hours | | | Retention rate of holding power after dipping in water for 2 hours |
|---|---|---|---|---|---|
| | | RC-spindle oil | Petroleum benzene | Kerosene | |
| 1 | 0.185 | 0.93 | 0.83 | 0.92 | 0.99 |
| 2 | 0.08 | 0.99 | 0.99 | 1.00 | 1.00 |

TABLE 5-continued

| Comparative Example | Holding power before treatment (kg/5 cm) | Retention ratio of holding power after dipping in solvent for 2 hours | | | Retention rate of holding power after dipping in water for 2 hours |
| --- | --- | --- | --- | --- | --- |
| | | RC-spindle oil | Petroleum benzene | Kerosene | |
| 3 | Spontanous peeling | — | — | — | — |
| 4 | 1.48 | 0.38 | 0.26 | 0.34 | 0.78 |
| 5 | 1.60 | — | 0.36 | — | 0.05> |
| 6 | 0.9 | — | 0.29 | — | 0.48 |
| 7 | 0.73 | — | 0.05 | — | — |

What is claimed is:

1. An acrylic type self-adhesive which comprises a polymer comprising units of (a) at least about 30% by mole of at least one compound of the formula:

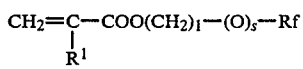

wherein $R^1$ is a hydrogen atom or a methyl, ethyl or propyl group, l is an integer of 1 to 5, s is 0 or 1, and Rf is $—(CF_2)_mX$ or $—(CF_2)_pO(CF_2)nF$ (wherein m is an integer of 1 to 10, X is a hydrogen or fluorine atom or a hexafluoroisopropyl group, n is an integer of 1 to 5 and p is an integer of 1 to 3), and optionally (b) at least one compound of the formula:

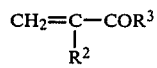

wherein $R^2$ is a hydrogen atom or a methyl, ethyl or propyl group and $R^3$ is $—OH$, $—NH_2$, $—NHCH_2OH$,

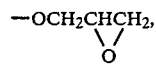

$—OCH_2CH_2OH$,

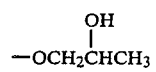

or $—OCH_2CH_2N(CH_3)_2$, said polymer having an intrinsic viscosity of 0.1 to 1.0 measured at 35° C. in methylethylketone or hexafluoro-m-xylene, a fluorine content of at least 20% by weight, and a glass transition point of −5° C. or lower.

2. The self-adhesive according to claim 1, wherein the content of the units of the compound (a) in the polymer is at least 70% by mole.

3. The self-adhesive according to claim 1, wherein the fluorine content of the polymer is at least 45% by weight.

4. The self-adhesive according to claim 1 or claim 2, wherein the compound (a) is one selected from the group consisting of 2,2,3,3,3-pentafluoropropyl acrylate, 2,2,3,3,4,4,4-heptafluorobutyl acrylate, 2,2,3,3,4,4,4-hexafluorobutyl acrylate, 2,2,3,3,4,5,5,5-octafluoro-4-tri-fluoromethylpentyl acrylate, 5,5,6,6,7,7,7-heptafluoro-3-oxaheptyl acrylate, 2,2,3,3,3,5,5,5-heptafluoro-4-oxapentyl acrylate, 1,1-dihydrononafluoro-4-oxahexyl acrylate and 1,1-dihydroundecafluoro-4-oxaheptyl acrylate, and corresponding methacrylate, 2-ethylacrylate and 2-propylacrylate.

5. The self-adhesive according to claim 1, wherein the compound (b) is one selected from the group consisting of acrylic acid, acrylamide, N-methylolacrylamide, methacrylic acid, methacrylamide-2-ethylacrylic acid, 2-ethylacrylamide, 2-propylacrylic acid and 2-propylacrylamide.

* * * * *